Dec. 8, 1964   C. H. WIKLUND   3,159,934
SLIDE MAGAZINE
Filed Oct. 17, 1961   3 Sheets-Sheet 1
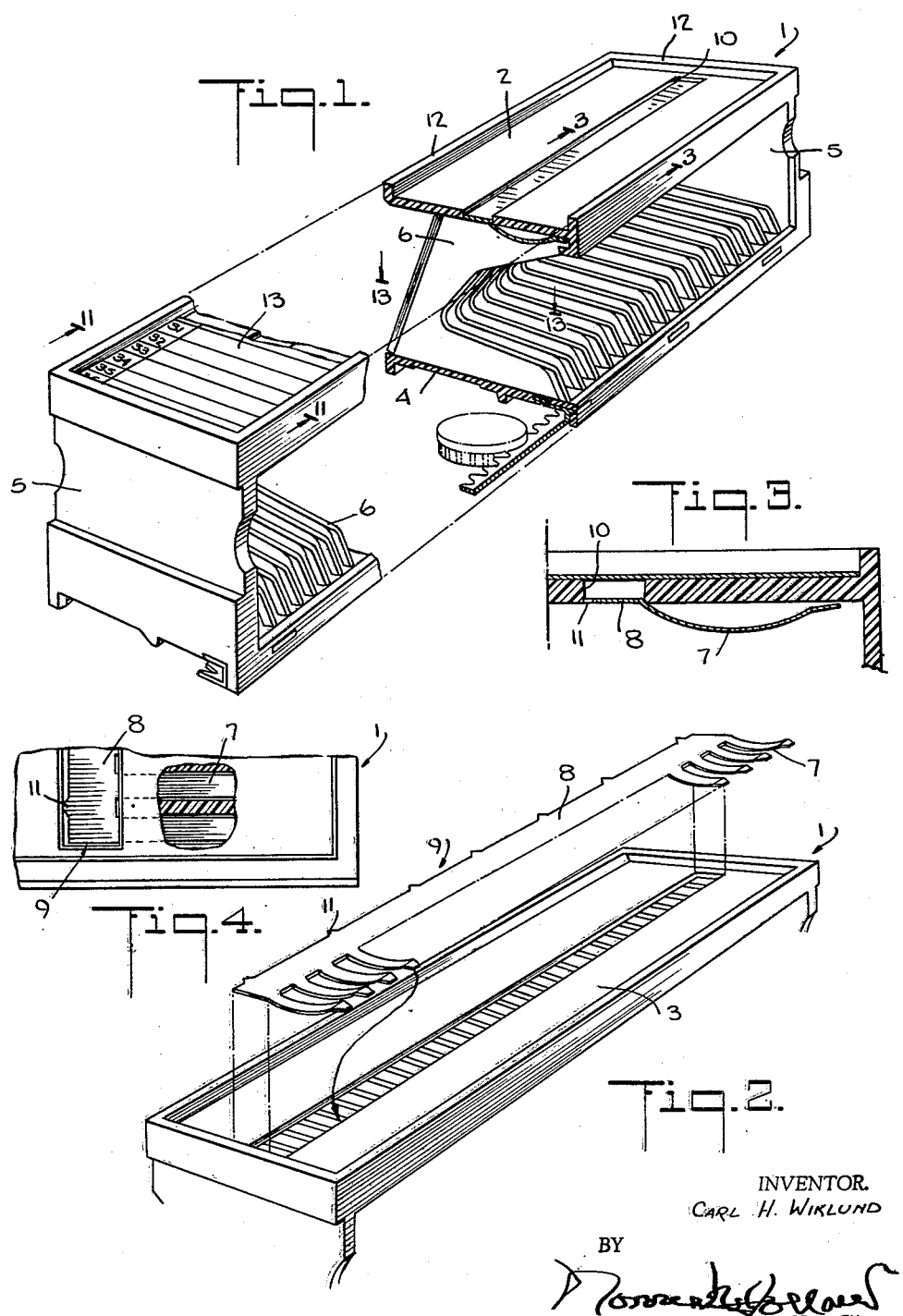
INVENTOR.
CARL H. WIKLUND
BY
ATTORNEY

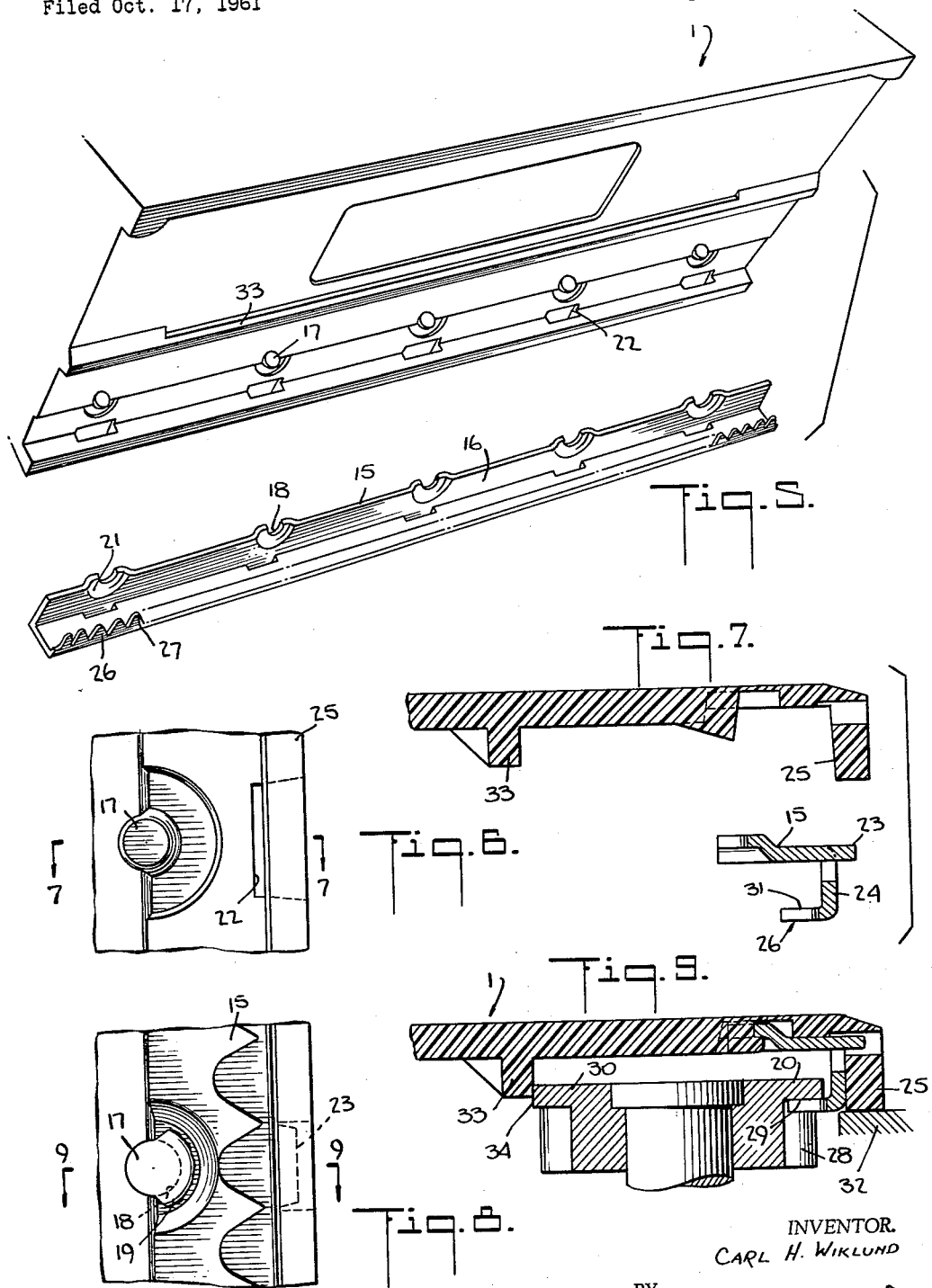

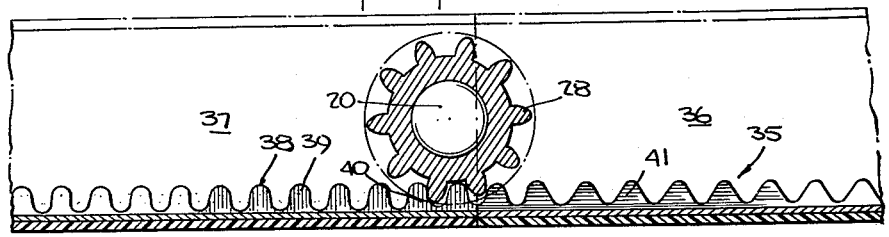
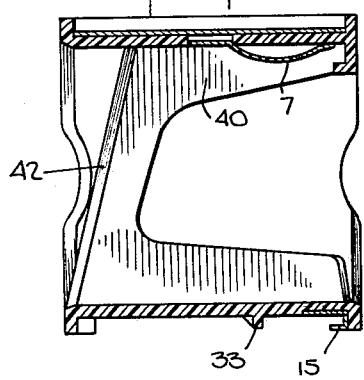
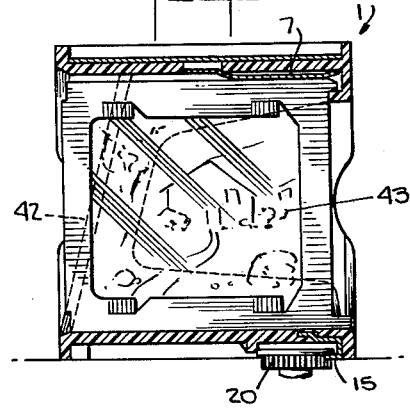
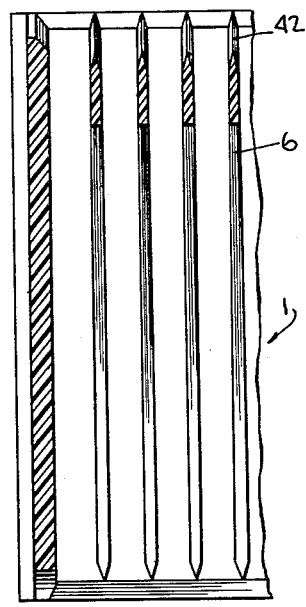
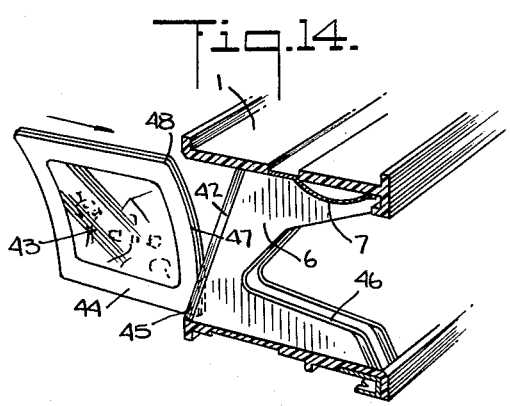

United States Patent Office

3,159,934
Patented Dec. 8, 1964

---

3,159,934
SLIDE MAGAZINE
Carl H. Wiklund, New Rochelle, N.Y., assignor, by mesne assignments, to Airequipt Inc., New Rochelle, N.Y., a corporation of New York
Filed Oct. 17, 1961, Ser. No. 145,616
8 Claims. (Cl. 40—79)

The present invention relates to an improved tray or magazine for storing and exhibiting transparent slides such as the widely used 35 mm. transparencies mounted in cardboard, plastic or metal frames as described in my Patent No. 2,711,602.

At present there are two principal types of slides trays or slide magazines. One of these is a molded plastic tray generally formed completely in a single molding operation and formed entirely of plastic material. Such magazines are particularly convenient due to their ease of manufacture and their relatively low cost. Another type of slide magazine is formed of metal. This type of tray has certain advantages over the plastic tray in that it has been more compactly made. Metal magazines also have been found to be well suited for use with individual metal slide frames adapted to mount and stiffen each of the individual transparencies.

The magazine of the present invention incorporates the best features of both types of magazines, i.e. it is extremely simple to manufacture and relatively inexpensive while at the same time being extremely compact and incorporating a precise indexing means uniquely adapted both to hold the magazine in position and to advance the magazine as the slides are projected.

Accordingly, an object of the present invention is to provide an improved slide tray or magazine.

Another object of the present invention is to provide a magazine combining compactness and low cost.

Another object of the present invention is to provide an improved magazine adapted for interchangeable use with metal magazines and accepting all types of slides.

Another object of the present invention is to provide a magazine especially adapted for trouble free operation with warped transparencies.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view partially cut away of the preferred embodiment of the magazine;

FIG. 2 is a fragmentary exploded perspective illustrating the means for mounting the slide retention spring.

FIG. 3 is a sectional view taken along line 3—3 of FIG. 1;

FIG. 4 is an enlarged detailed plan view of a corner of the magazine illustrating the attachment of the slide retention spring;

FIG. 5 is an exploded perspective illustrating the metal indexing rack and the plastic seat on the bottom of the magazine adapted to receive the rack;

FIG. 6 is an enlarged detailed plan view of the rack attachment means;

FIG. 7 is a sectional view taken along line 7—7 of FIG. 6;

FIG. 8 is an enlarged detailed plan view corresponding to FIG. 6 with the rack attached to the magazine;

FIG. 9 is a sectional view taken along line 9—9 of FIG. 8;

FIG. 10 is a horizontal sectional view illustrating the rack portion of the magazine in engagement with the indexing gear of a projector;

FIG. 11 is a vertical sectional view taken along line 11—11 of FIG. 1;

FIG. 12 is a vertical sectional view corresponding to FIG. 11 showing an alternate embodiment wherein individual metal frames are provided for each slide;

FIG. 13 is a sectional view taken along line 13—13 of FIG. 1; and

FIG. 14 is a fragmentary perspective view of the preferred embodiment of the magazine illustrating the operation of the slanted divider edge in guiding a warped transparency into a compartment of the magazine.

As illustrated in FIG. 1, the preferred embodiment of the magazine 1 comprises a molded plastic body 2 formed by the usual molding processes and preferably formed in one piece. The body 2 has integral top 3, bottom 4, ends 5 and partitions 6.

In the preferred embodiment, a spring finger 7 is provided at the top of each compartment between partitions 6 to releasably retain each of the individual slides in its compartment. Preferably, the spring fingers 7 are formed from a single metal strip as best illustrated in FIG. 2 with each of the individual spring fingers 7 projecting from the base 8 providing a unitary spring member 9. An elongated slot 10 is formed in the top 3 of the magazine to receive the base portion 8 of the spring member 9 and to permit each of the spring fingers 7 to project into a compartment as illustrated in FIG. 3. A preferred means of locking the spring member 9 in place is provided by the several spaced pointed locking projections 11 formed on the back of each base 8 so that they tightly engage the rear wall of the slot 10 when the spring member 9 is placed in the slot 10 and the base 8 is forced downwardly into the slot 10.

The indexing rack 15 which cooperates with a projector indexing gear is preferably formed of relatively thin gauge metal. The rack 15 is attached to the bottom of the magazine body 2 as illustrated in detail in FIGS. 5 through 9. The preferred embodiment of the rack 15 has a C-shaped or channeled cross-section as illustrated in FIG. 7. The upper flange 16 of the rack 15 is mounted flush against the bottom 4 of the magazine and is attached thereto by the engagement of several plastic lock knobs 17 with a set of complementary lock slots 18 formed on the flange portion 16. The rack 15 is positioned with each slot 18 engaging a corresponding plastic knob 17 and then the plastic knobs 17 are heated and pressed as illustrated in FIG. 8 so that the knobs 17 are forced downwardly into engagement with the rack 15 around the edges of the slots 18 with a locking projection 19. In order to keep this plastic locking flange 19 above the level of the rack to prevent interference between the rack 15 and the magazine advancing gear 20, the slots 18 are preferably formed in suitably indented portion 21 on the upper flange 16 of the rack 15. To further insure a rigid connection with the bottom 4 of the magazine, a series of apertures 22 are formed during the molding of the magazine and they are proportioned to receive and tightly engage complementary locking tabs 23 cut in the rack 15 and formed during the shaping of the rack 15 into its preferred channel shape. The vertical portion 24 of the rack 15 abuts a depending flange 25 formed along the front edge of the bottom 4 of the magazine. As best illustrated in FIG. 9, the magazine 1 is adapted to be both guided and advanced by its bottom 4. This is done by providing the rack teeth 27 on the horizontal lower flange 26 of the rack 15 so that they engage the teeth 28 of the magazine indexing wheel 20 and at the same time abut the lower surface 29 of a circular locking disc 30 provided at the top of the gear 20. The disc 30 engages the upper surface 31 of the toothed flange 26 and thereby holds the magazine down on the projector base plate 32. This locking action is also facilitated by the provision of an elongated guide rail 33 molded on the lower surface of the magazine bottom 4 to slidably engage the edge 34 of the locking disc 30. It is thus apparent that this channel shaped indexing rack not only provides a precise compact rack for precision indexing but also provides a rack which cooperates with the indexing gear 20 and a spaced rail 33 to hold the magazine 1 in position on the projector base plate 32. This permits a relatively simple projector structure requiring few additional magazine guide members at the side and the top of the magazine. It thus permits these surfaces of the magazine to be exposed as desired to facilitate the handling of the magazines and to simplify the structure of the projector.

The use of the metal rack permits the teeth to be relatively deep and narrow so that indexing can be controlled for compact magazines having narrow slide tray compartments. Such narrow compartments are preferable as they result in a compact slide tray in which more slides may be stored in a magazine of given size. The use of the metal rack also permits a magazine which is interchangeable with presently used metal magazines such as, for example, a magazine as illustrated in my Patent No. 2,711,602.

FIG. 10 illustrates another embodiment of a rack 35 for a magazine 36 which is adapted for use in an interchangeable manner with a second magazine 37 having narrower slide storage compartments. The narrower storage compartments of magazine 37 require an indexing rack 38 on the magazine 37 having teeth 39 with a smaller pitch since this magazine is stepped a shorter distance when indexed from slide to slide.

As illustrated in FIG. 10, the indexing gear 20 simultaneously engages teeth of the racks 35 and 38 when magazine 36 is fed into a projector in contact with the preceding magazine 37. The end teeth 39 of rack 38 and the first teeth 40 of the rack 35 will both be engaged as illustrated. In order to prevent a different rate of movement due to different compartment size from jamming the two magazines together, one or more teeth 40 are provided with the same pitch of teeth 39 so that the initial step of the second magazine 36 moves this magazine the same distance as the preceding magazine 37 is moved. A suitable spacing is provided for the end dividers 6 when rack 35 is used. After the first step or two, the rack 38 is released from gear 20 and the greater pitched teeth 41 on rack 35 are used without interference.

The preferred embodiment of the dividers 6 which form the individual compartments for the slides 43 is illustrated in FIGS. 11 through 14. These dividers 6 are molded as an integral part of the plastic body 2 of the magazine. Each of the dividers 6 preferably has a slanted and tapered rear edge 42 to facilitate the re-entry of warped slide frames 43 as they are returned to the magazine 1 after projection. FIG. 14 illustrates a warped slide 43 being returned to the magazine 1. The lower edge 44 of the slide will be centered by the slide transfer means and the related guide channels associated with the projector. This will cause the lower edge 43 to be centered with respect to the lower portion 45 of the divider 6. The slanted rear edge 42 of the divider 6 permits the slide 43 to advance into the compartment 46 as its slanted surface acts as a camming surface as it engages successively higher points on the leading edge 47 of the slide 43 thereby gently straightening and guiding the slide 43 as necessary to permit it to pass into the compartment 46. As the slide reaches the above described spring fingers 7 intermediate dividers 40, the spring fingers 7 resiliently engage the top 48 of the slide 43 to yieldably retain the slide 43 in position as the magazine 1 is advanced through the projector and also during subsequent removal and handling of the magazine 1.

A preferred form of the top 3 of the magazine 1 is illustrated in FIG. 1 wherein front, rear and side channel members 12 are formed at the edges of the top 3 both to stiffen the slide tray and to form a recess which accommodates a suitable slide identification card 13 which is slipped into the recess formed by the flange members 12 and replaceably retained therein. The indexing card 13 provides a precise identification of the slides since the appropriate description is provided immediately above each slide so that it is conveniently identified by a direct reading indicator as the magazine moves through a projector.

It will be seen that the present invention provides an improved slide tray or magazine for slides or transparencies which combines the best features of metallic and plastic trays and which is extremely compact and which is also particularly adapted for use with a projector magazine handling system of extreme simplicity. The magazine also is particularly adapted for use with transparencies in all types of mounts and also is adapted to handle mounts which are warped or otherwise damaged.

The magazine includes a precision magazine indexing rack in combination with a plastic body and a novel, effective and simple means is provided for combining a plastic magazine body and a metal indexing. A slide retaining spring member is also combined in a simple and effective way in the improved magazine.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An elongated slide magazine comprising the combination of a body member having a top and a bottom and a plurality of parallel transverse partitions forming spaced slide compartments, a rack on the bottom extending longitudinally of the magazine and having its teeth projecting inwardly from one edge of the magazine and spaced from the bottom of the magazine, and an elongated guide rail on said rack adapted for sliding engagement with a smooth circumferential surface of a toothed magazine indexing wheel and spaced less than the wheel diameter from said rack.

2. The magazine as claimed in claim 1 which further comprises a second elongated guide rail on said bottom and parallel to and spaced from said first guide rail.

3. In combination a slide magazine having a top and a bottom and a plurality of parallel transverse partitions forming spaced slide compartments, a rack on the bottom extending longitudinally of the magazine and having its teeth projecting inwardly from the edge of the magazine and spaced from the bottom of the magazine, and an indexing gear engaging said rack and having a smooth annular surface parallel to said bottom and slidably engaging an upper parallel bearing surface of said rack.

4. The combination as claimed in claim 3 which further comprises an elongated guide rail on said bottom parallel to and spaced from said rack and in sliding engagement with a generally vertical annular surface on said indexing gear.

5. The combination as claimed in claim 3 in which said rack comprises a metal channel with the rack teeth comprising a horizontal flange and the upper surface of the teeth comprising said bearing surface.

6. The magazine as claimed in claim 1 which further comprises resilient members projecting inwardly of said compartments, said resilient members extending from a common elongated base mounted in a complementary slot in said top, and said base being frictionally engaged with the side walls of said slot.

7. The magazine as claimed in claim 1 in which said transverse partitions have one of their edges intermediate said top and bottom extending inwardly of said magazine along a generally straight line towards the opposite edge of the partition to facilitate the entry of slides into the magazine.

8. The magazine as claimed in claim 1 in which the teeth on one end of said rack have a lesser pitch than the remaining teeth on said rack.

References Cited in the file of this patent

UNITED STATES PATENTS

| | | |
|---|---|---|
| 1,208,346 | Marsh | Dec. 12, 1916 |
| 2,262,789 | Heller | Apr. 16, 1918 |
| 1,698,249 | Wiehl | Jan. 8, 1929 |
| 2,491,945 | Baker | Dec. 20, 1949 |
| 2,585,971 | Sloane | Feb. 19, 1952 |
| 2,711,602 | Wiklund | June 28, 1955 |
| 2,720,204 | Wallach | Oct. 11, 1955 |
| 2,837,851 | Wiklund | June 10, 1958 |
| 2,883,989 | Ulrich | Apr. 28, 1959 |
| 2,900,074 | Windman | Aug. 18, 1959 |
| 2,931,115 | Pester et al. | Apr. 5, 1960 |
| 2,931,116 | Boughton | Apr. 5, 1960 |
| 3,045,816 | King | July 24, 1962 |

FOREIGN PATENTS

| | | |
|---|---|---|
| 1,248,675 | France | Nov. 14, 1960 |

UNITED STATES PATENT OFFICE
CERTIFICATE OF CORRECTION

Patent No. 3,159,934 December 8, 1964

Carl H. Wiklund

It is hereby certified that error appears in the above numbered patent requiring correction and that the said Letters Patent should read as corrected below.

Column 4, line 57, for "rack" read -- bottom --.

Signed and sealed this 18th day of May 1965.

(SEAL)
Attest:

ERNEST W. SWIDER
Attesting Officer

EDWARD J. BRENNER
Commissioner of Patents